(12) United States Patent
Murakami et al.

(10) Patent No.: US 11,788,451 B2
(45) Date of Patent: Oct. 17, 2023

(54) CONTROL METHOD AND CONTROL DEVICE FOR INTERNAL COMBUSTION ENGINE

(71) Applicant: NISSAN MOTOR CO., LTD., Yokohama (JP)

(72) Inventors: Kouichi Murakami, Kanagawa (JP); Jin Yokoyama, Kanagawa (JP); Akikazu Sakai, Kanagawa (JP); Hideaki Takahashi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/926,689

(22) PCT Filed: May 28, 2020

(86) PCT No.: PCT/IB2020/000511
§ 371 (c)(1),
(2) Date: Nov. 21, 2022

(87) PCT Pub. No.: WO2021/240189
PCT Pub. Date: Dec. 2, 2021

(65) Prior Publication Data
US 2023/0193799 A1    Jun. 22, 2023

(51) Int. Cl.
*F01N 3/20* (2006.01)
*F01N 3/05* (2006.01)
*F01N 9/00* (2006.01)
*F01N 3/32* (2006.01)

(52) U.S. Cl.
CPC ................ *F01N 3/2013* (2013.01); *F01N 3/05* (2013.01); *F01N 3/32* (2013.01); *F01N 9/00* (2013.01); *F01N 2270/02* (2013.01); *F01N 2550/22* (2013.01); *F01N 2900/0421* (2013.01); *F01N 2900/1404* (2013.01)

(58) Field of Classification Search
CPC ... F01N 3/2013; F01N 3/05; F01N 3/32; F01N 9/00; F01N 2270/02; F01N 2550/22; F01N 2900/0421; F01N 2900/1404
See application file for complete search history.

(56) References Cited

U.S. PATENT DOCUMENTS

2013/0305692 A1*  11/2013  Hashimoto .............. F01N 3/10
                                                            60/299

FOREIGN PATENT DOCUMENTS

JP          2015-075068 A     4/2015

* cited by examiner

*Primary Examiner* — Brandon D Lee
(74) *Attorney, Agent, or Firm* — Foley & Lardner LLP

(57) ABSTRACT

An internal combustion engine (1) has an electric heating catalyst (5) in an exhaust passage (2). When it is detected that a door has been opened, the electric heating catalyst (5) is preheated. If power of an engine controller (8) is lost during the preheating, information on an estimated temperature, which is stored in the engine controller (8), is lost. The engine controller (8) forbids energization of the electric heating catalyst (5) until a cooling period necessary for temperature of the electric heating catalyst (5) to fall elapses after recovery of the power of the engine controller (8). After the cooling period elapses, the preheating is started again.

8 Claims, 10 Drawing Sheets

CONTROL METHOD AND CONTROL DEVICE FOR INTERNAL COMBUSTION ENGINE

The present invention relates to a control method and a control device for an internal combustion engine having an electric heating catalyst in an exhaust system.

BACKGROUND ART

It is known that in order to improve exhaust performance immediately after a cold start of an internal combustion engine, an electric heating catalyst that can be forcibly heated by energization is used in an exhaust system. By preheating the electric heating catalyst by energizing the electric heating catalyst before starting the internal combustion engine, it is possible to obtain an exhaust gas purification action at an early stage after the start of the internal combustion engine.

Patent Document 1 discloses that the electric heating catalyst is energized until the total sum of an energization amount reaches a target energization amount. Further, when the energization is interrupted by a start request of the internal combustion engine, an energization amount after resumption of the preheating is increased by taking a cooling amount during the interruption of the preheating into account.

In general, it is difficult to directly detect temperature of the electric heating catalyst. Then, for instance, the temperature of the electric heating catalyst during the preheating is sequentially estimated by integration or accumulation etc. of the energization amount from a start of the energization. However, if power of an engine controller is temporarily lost during the preheating due to some unexpected cause, information on the estimated temperature is lost. As a consequence, when the power is recovered, the same preheating as in a normal cold state is performed from an initial state, and if the preheating is resumed while the electric heating catalyst is still at a high temperature, the electric heating catalyst is excessively heated, and this consequently may cause failure of the electric heating catalyst. Patent Document 1 does not disclose such a problem.

CITATION LIST

Patent Document

Patent Document 1 : Japanese Unexamined Patent Application Publication No. JP2015-075068

SUMMARY OF THE INVENTION

In the present invention, when information on the estimated temperature is lost during the preheating due to loss of power of an engine controller, energization of the electric heating catalyst is forbidden or stopped until a cooling period necessary for temperature of the electric heating catalyst to fall elapses after recovery of the power of the engine controller.

By providing the cooling period in this way, the energization is forbidden or stopped until the temperature of the electric heating catalyst is lowered to such a temperature as not to cause an excessive temperature rise even if a normal preheating is performed, then the electric heating catalyst is surely protected.

EMBODIMENTS FOR CARRYING OUT THE INVENTION

Figure 1:
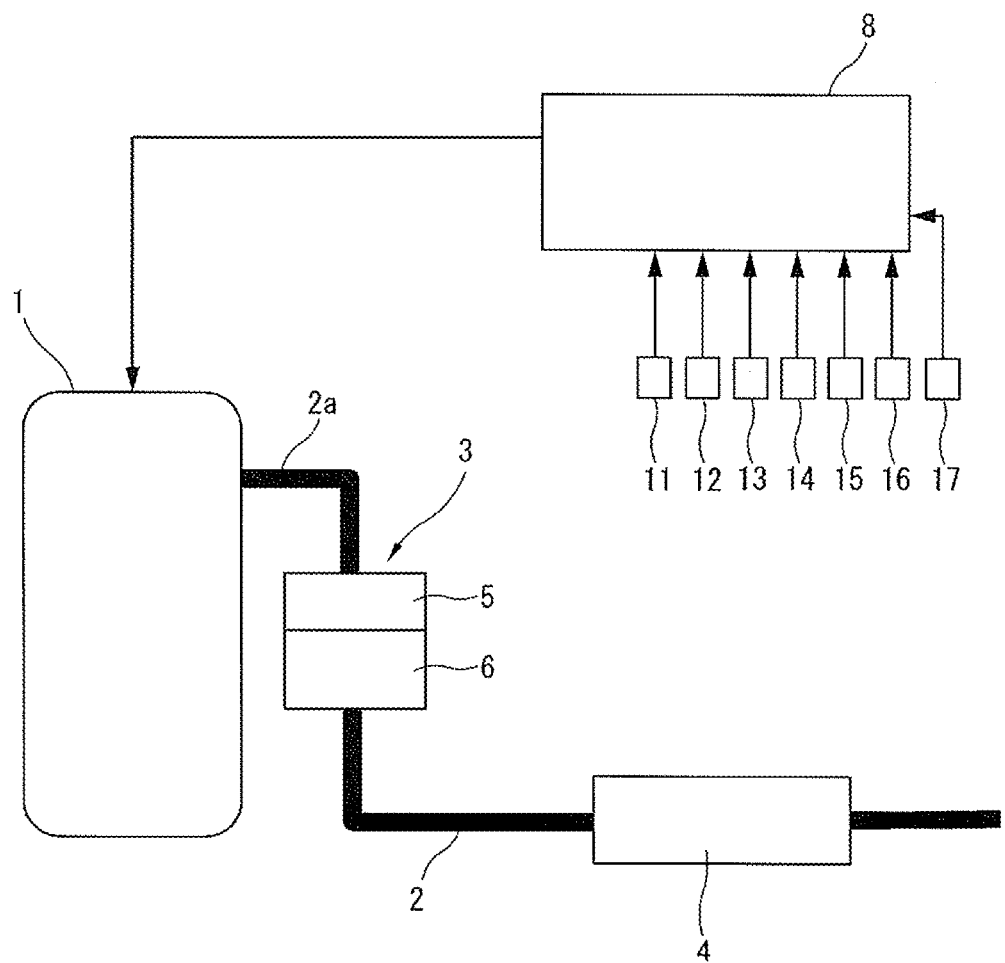
FIG. 1 is an explanatory drawing schematically showing a system configuration of an internal combustion engine according to the present invention.

FIG. 1 is an explanatory drawing schematically showing a system configuration of an internal combustion engine 1 according to the present invention. The internal combustion engine 1 is, for instance, a spark ignition internal combustion engine using gasoline as fuel. In a vehicle that is not a hybrid vehicle, the internal combustion engine 1 is mounted on the vehicle together with a transmission, and the vehicle is directly driven by an output of the internal combustion engine 1. In a so-called parallel hybrid vehicle, the internal combustion engine 1 is mounted on the vehicle together with an electric motor, and both of the electric motor and the internal combustion engine 1 are used as travelling drive sources. In a so-called series hybrid vehicle, the internal combustion engine 1 is used to drive a generator, and the vehicle travels by an electric motor with generated power.

The internal combustion engine 1 has an intake system (not shown) and an exhaust system. An exhaust passage 2 constituting the exhaust system extends from the internal combustion engine 1 to a rear end of the vehicle. A catalyst device is provided in the exhaust system in order to purify exhaust gas emitted from the internal combustion engine 1. In the illustrated example, the catalyst device includes a pre-catalyst 3 that is provided in the vicinity of an outlet of an exhaust manifold 2a in the exhaust passage 2 and a main catalyst 4 that is located at a downstream side with respect to the pre-catalyst 3 and arranged under a vehicle floor.

The pre-catalyst 3 further includes an electric heating catalyst 5 that constitutes an upstream portion of the pre-catalyst 3 and a catalyst 6 that constitutes a downstream portion of the pre-catalyst 3, and both these catalysts are accommodated in one casing. The electric heating catalyst 5 has, for instance, a structure in which a heating element that generates heat by being energized is used as a catalyst carrier, and its surface is coated with an appropriate catalyst metal, which becomes a three-way catalyst or an oxidation catalyst, as slurry. Alternatively, the electric heating catalyst 5 could have a structure in which an independent heater is combined with the catalyst carrier. The catalyst 6 has, for instance, a structure in which a surface of a monolithic ceramic catalyst in which fine passages are formed is coated with an appropriate catalyst metal, which becomes a three-way catalyst or an oxidation catalyst, as slurry.

Similar to the catalyst 6, the main catalyst 4 has, for instance, a structure in which a surface of a monolithic ceramic catalyst in which fine passages are formed is coated with an appropriate catalyst metal, which becomes a three-way catalyst or an oxidation catalyst, as slurry.

Here, it could also be possible to combine a fine particle filter that collects exhaust fine particles with a part of the pre-catalyst 3 and/or the main catalyst 4.

Energization of the electric heating catalyst 5 is controlled by an engine controller 8. It is noted that in the illustrated example, the engine controller 8 uses, as a power source, a 12-volt battery (not shown) that supplies power to general electrical components of the vehicle, whereas the electric heating catalyst 5 uses, as a power source, a 48-volt battery (not shown) that can supply a greater power. The electric heating catalyst 5 receives the power from the 48-volt battery through a relay, a switching element and so on. However, the 12-volt battery may be used as the power source of the electric heating catalyst 5.

The engine controller 8 executes a variety of controls of the internal combustion engine 1 typified by control of a fuel injection amount and an injection timing by a fuel injection valve (not shown) of the internal combustion engine 1, control of an ignition timing by an ignition plug (not shown) and control of an opening degree of a throttle valve (not shown). As one of these controls of the internal combustion engine 1, the energization of the electric heating catalyst 5 for preheating the electric heating catalyst 5 at a cold start is controlled. The engine controller 8 inputs a number of detection signals from a variety of sensors and other controllers. As typical sensors, for instance, an air flow meter 11 for detecting an intake air amount of the internal combustion engine 1, a crank angle sensor 12 for detecting a rotation speed of the internal combustion engine 1, a water temperature sensor 13 for detecting a cooling water temperature, an oil temperature sensor 14 for detecting a lubricating oil temperature and an air-fuel ratio sensor 15 for detecting an exhaust air-fuel ratio in the exhaust passage 2 for air-fuel ratio feedback control are provided, and their detection signals are input to the engine controller 8. Further, a battery controller 16 that monitors a state of the 48-volt battery supplying the power to the electric heating catalyst 5 sends a signal indicating a charge amount of the 48-volt battery, i.e. an SOC of the 48-volt battery, to the engine controller 8. Furthermore, as a trigger for starting the preheating before the start of the internal combustion engine 1, a door switch 17 that detects an opening operation of driver's seat door of the vehicle is connected to the engine controller 8.

In this embodiment, basically, when the driver's seat door of the vehicle is opened, the energization of the electric heating catalyst 5 is started, that is, the preheating of the electric heating catalyst 5 is started. It is noted that if the cooling water temperature etc. indicate that the internal combustion engine 1 is in a warm-up state, the preheating is not carried out. After the start of the preheating, temperature of the electric heating catalyst 5 is sequentially estimated by integration or accumulation etc. of an energization amount of the electric heating catalyst 5. When this estimated temperature reaches a predetermined temperature, it is judged that the preheating is completed, and the energization of the electric heating catalyst 5 is ended.

During execution of such preheating, if the power of the engine controller 8 is temporarily lost due to some unexpected cause before the preheating is normally or properly completed, information on the estimated temperature is lost. In such a case, if the normal preheating is resumed when the power is recovered, the temperature of the electric heating catalyst 5 may become excessively high, which is not preferable. As examples of the loss of the power of the engine controller 8, replacement of the 12-volt battery serving as the power source of the engine controller 8, disconnection or breakage of a power supply line and momentary or instantaneous voltage drop are raised.

In the present invention, in order to protect the electric heating catalyst 5 against such a temporary loss of the power, after the temperature of the electric heating catalyst 5 is once lowered, the start of the preheating is permitted.

Figure 2:
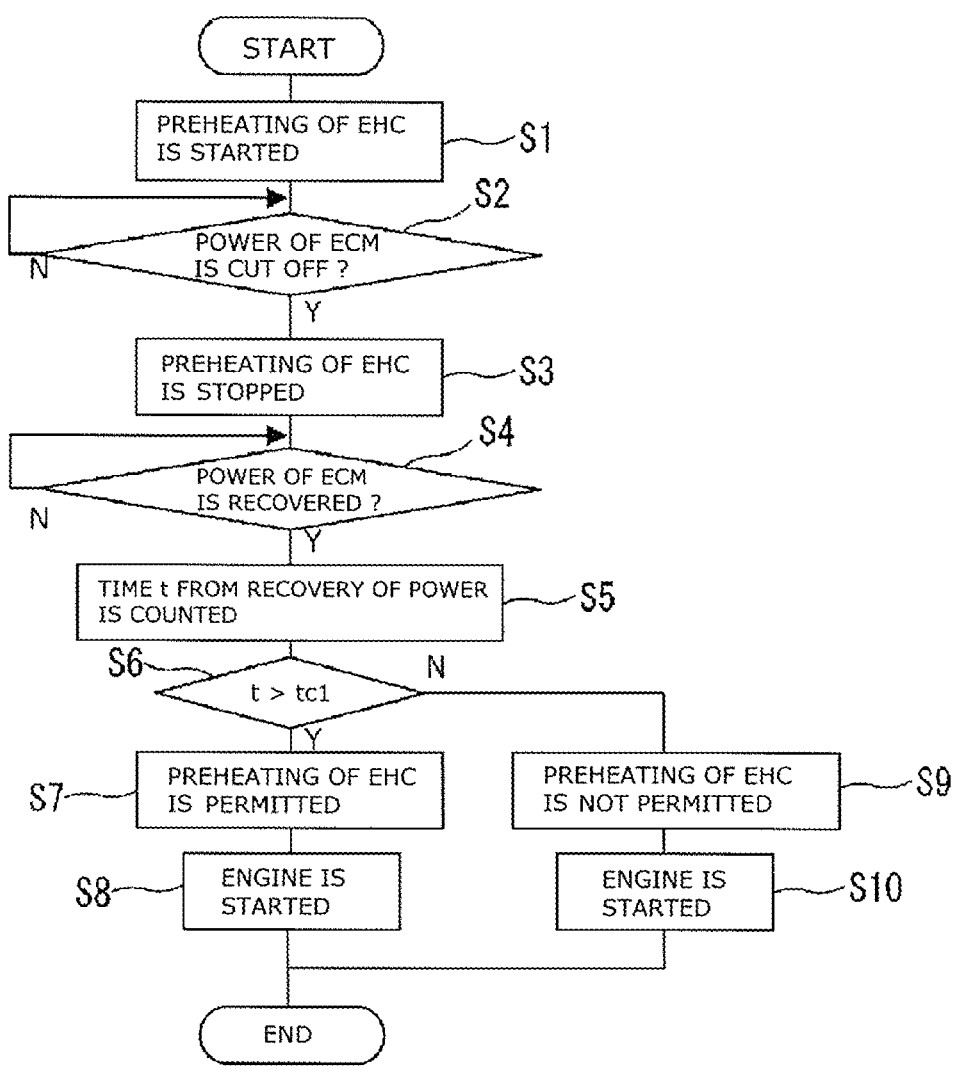
FIG. 2 is a flow chart showing a flow of a process of a first embodiment.

FIG. 2 is a flow chart showing a flow of a process of a first embodiment. This flow chart does not represent a computer program itself, but is an explanatory flow chart showing the flow of the process in time sequence. First, when it is detected that the driver's seat door has been opened, the energization of the electric heating catalyst 5 (abbreviated to EHC in the flow chart etc.) is started, that is, the preheating of the electric heating catalyst 5 is started (step S1). Subsequently, a judgment is made as to whether or not an event in which the power of the engine controller 8 (abbreviated to ECM in the flow chart etc.) is lost (cut off) has occurred (step S2). If the loss of the power of the engine controller 8 does not occur until the preheating is completed, as described above, when the estimated temperature of the electric heating catalyst 5 reaches the predetermined temperature, the energization is ended.

When the power of the engine controller 8 is cut off, the energization of the electric heating catalyst 5 is stopped by and according to this cut-off (step S3). Afterwards, when the power of the engine controller 8 is recovered (step S4), the engine controller 8 starts to measure a timer t that measures an elapsed time from a time of this recovery of the power (step S5). Then, the engine controller 8 compares a value of this timer t with a previously set predetermined threshold value tc1 (step S6). When the value of the timer t, i.e. the elapsed time from the recovery of the power, is the threshold value tc1 or less, as shown as step S9, the energization (the preheating) of the electric heating catalyst 5 is forbidden or stopped. If there is a start request of the internal combustion engine 1 during this period, as shown as step S10, the internal combustion engine 1 is started without preheating the electric heating catalyst 5.

When the elapsed time t from the recovery of the power exceeds the threshold value tc1, as shown as step S7, the energization of the electric heating catalyst 5, i.e. the preheating of the electric heating catalyst 5, is performed as usual. That is, the preheating from an initial state in which the electric heating catalyst 5 is regarded as being in a cold state is performed again. Then, the internal combustion engine 1 is started by and according to the start request of the internal combustion engine 1 (step S8). Here, a time required for the preheating is, e.g. about several seconds.

The threshold value tc1 corresponds to a cooling period by natural heat radiation. The threshold value tc1 is set as a sufficient time for the temperature of the electric heating catalyst 5 (particularly, its heater portion) to lower to a certain temperature (a temperature at which there is no hindrance even if the preheating is resumed) assuming that the temperature of the electric heating catalyst 5 has risen to a preheating completion temperature before the loss of the power of the engine controller 8. For instance, it is several tens of seconds to several minutes. That is, since a time from the loss of the power to the recovery of the power cannot be measured, the cooling period is fixedly set to a necessary time with consideration given to a possibility that the temperature of the electric heating catalyst 5 is in the vicinity of the preheating completion temperature at a time of the recovery of the power.

As described above, in the first embodiment, when the information on the estimated temperature is lost during the preheating due to the loss of the power of the engine controller 8, the energization of the electric heating catalyst 5 is forbidden or stopped until the cooling period necessary for the temperature of the electric heating catalyst 5 to fall elapses after the recovery of the power of the engine controller 8. Therefore, an excessive temperature rise of the electric heating catalyst, 5 due to re-preheating (re-energization) is avoided.

Figure 3:
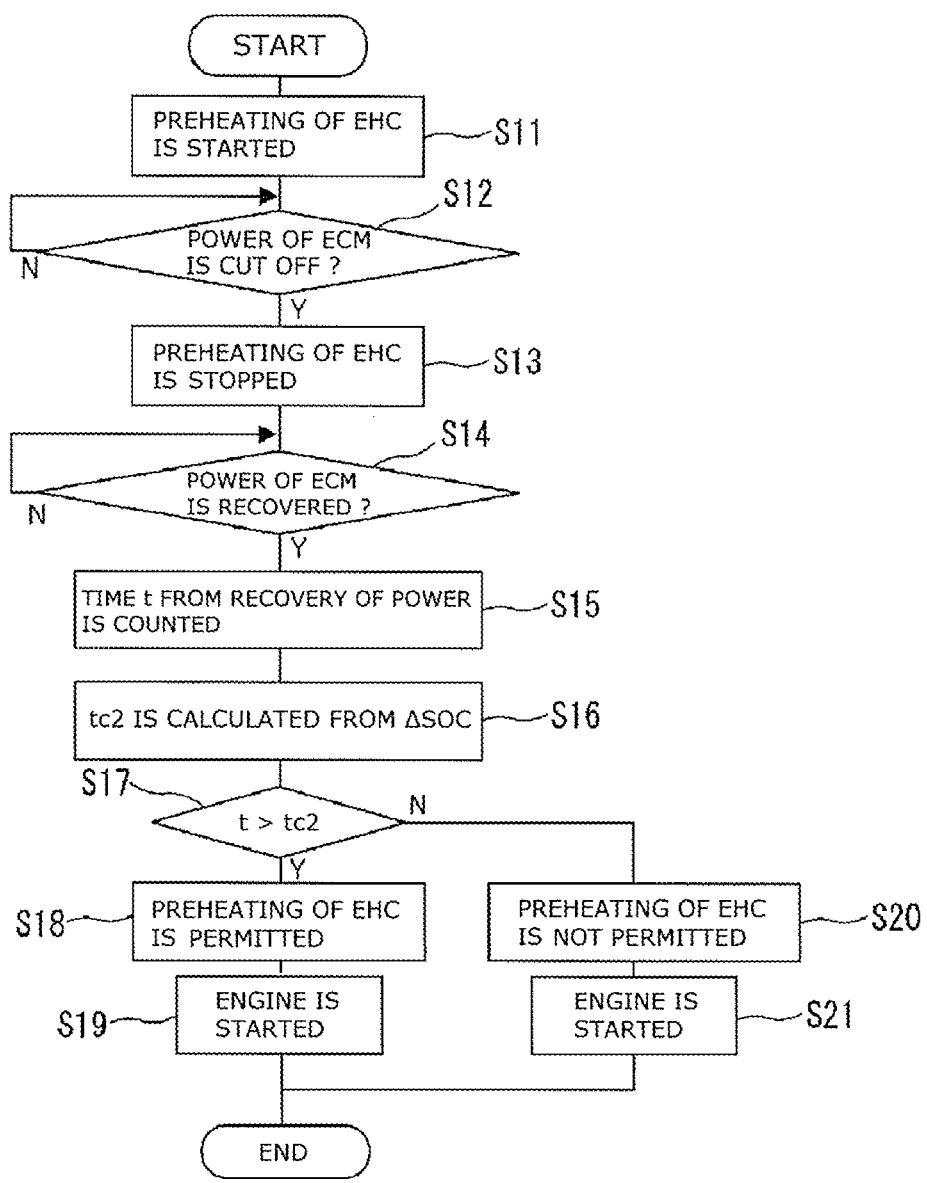
FIG. 3 is a flow chart showing a flow of a process of a second embodiment.

Next, FIG. 3 is a flow chart showing a flow of a process of a second embodiment. Steps S11 to S15 are the same as steps S1 to S5 of the first embodiment. When it is detected that the driver's seat door has been opened, the energization of the electric heating catalyst 5 is started, that is, the preheating of the electric heating catalyst 5 is started (step S11). Subsequently, a judgment is made as to whether or not an event in which the power of the engine controller 8 is lost (cut off) has occurred (step S12).

When the power of the engine controller 8 is cut off, the energization of the electric heating catalyst 5 is stopped by and according to this cut-off (step S13). Afterwards, when the power of the engine controller 8 is recovered (step S14), the engine controller 8 starts to measure a timer t that measures an elapsed time from a time of this recovery of the power (step S15).

Here, in the second embodiment, as a parameter indicating an energization amount of the electric heating catalyst 5 from a start of the energization of the electric heating catalyst 5 to the interruption of the energization (the loss of the power of the engine controller 8), a change amount (a variation) ΔSOC of the SOC of the 48-volt battery is determined, and on the basis of this ΔSOC, a threshold value tc2 corresponding to the cooling period is determined (step S16).

Subsequent flows are the same as those of the first embodiment. At step S17, the engine controller 8 compares a value of the timer t with the threshold value tc2. When the value of the timer t, i.e. the elapsed time from the recovery of the power, is the threshold value tc2 or less, as shown as step S20, the energization (the preheating) of the electric heating catalyst 5 is forbidden or stopped. If there is a start request of the internal combustion engine 1 during this period, as shown as step S21, the internal combustion engine1 is started without preheating the electric heating catalyst 5.

When the elapsed time t from the recovery of the power exceeds the threshold value tc2, as shown as step S18, the energization of the electric heating catalyst 5, i.e. the preheating of the electric heating catalyst 5, is performed as usual. That is, the preheating from an initial state in which the electric heating catalyst 5 is regarded as being in a cold state is performed again. Then, the internal combustion engine 1 is started by and according to the start request of the internal combustion engine 1 (step S19).

Figure 4:
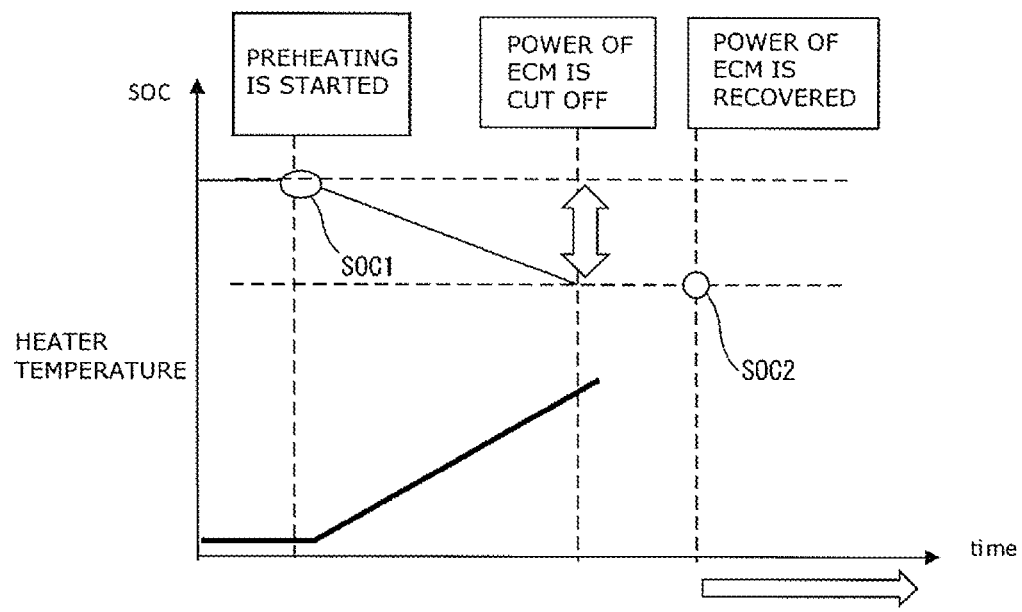
FIG. 4 is a time chart showing changes in temperature of an electric heating catalyst and an SOC with the lapse of time during preheating.

In this second embodiment, the cooling period, which is a waiting time until the preheating is resumed, is set to be shorter than that in the first embodiment. FIG. 4 shows changes in the SOC and the temperature of the electric heating catalyst 5 (particularly, its heater portion) with the lapse of time from the start of the energization before the loss of the power. As shown in the drawing, the preheating is started by and according to the opening operation of driver's seat door and so on, the temperature of the electric heating catalyst 5 gradually increases, and the charge amount of the 48-volt battery, i.e. the SOC of the 48-volt battery, gradually decreases. When the loss of the power of the engine controller 8 occurs, the temperature (the estimated temperature) of the electric heating catalyst 5 after the loss becomes unknown. On the other hand, as for the SOC, a value SOC1 of the SOC at the time of the start of the energization is stored in a nonvolatile memory of the engine controller 8 or the battery controller 16. Then, a value SOC2 of the SOC at the time of the recovery of the power is estimated by the battery controller 16, for instance, on the basis of a voltage of the 48-volt battery. Therefore, a difference ΔSOC (≈SOC1-SOC2) between both SOCs can be determined, and this change amount (the variation) ΔSOC of the SOC is basically correlated with an amount of heat applied to the electric heating catalyst 5 for a period from the start of the preheating to the loss of the power, which in turn is correlated with the temperature of the electric heating catalyst 5 at the time of the loss of the power.

Figure 5:
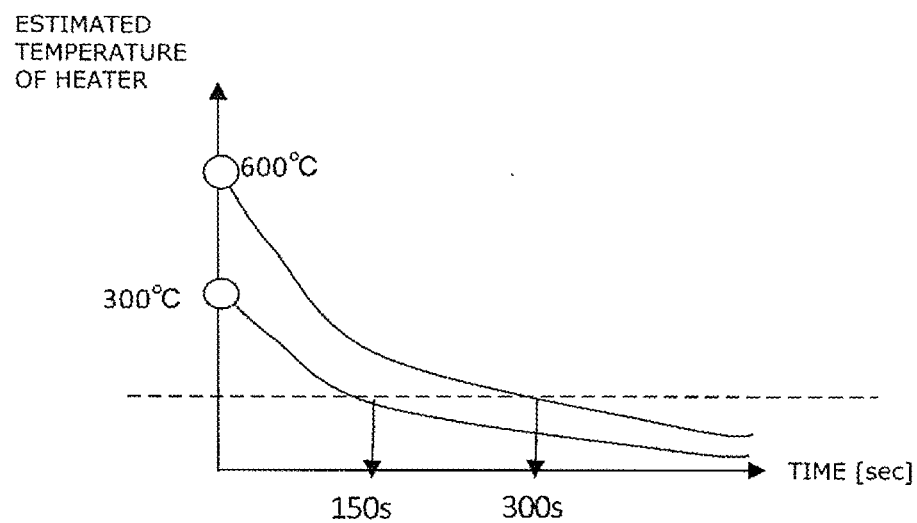
FIG. 5 is a characteristic diagram showing a state of temperature decrease of the electric heating catalyst after stop of energization.

Although the temperature of the electric heating catalyst 5 at the time of the recovery of the power cannot be known correctly, at least the temperature of the electric heating catalyst 5 does not exceeds the temperature at the time of the loss of the power. FIG. 5 shows the temperature of the electric heating catalyst 5 at the time of the recovery of the power and a subsequent change in the temperature of the electric heating catalyst 5 by natural cooling (self-cooling) with the lapse of time, and the higher the estimated temperature at the time of the recovery of the power is, the longer the necessary time for the temperature of the electric heating catalyst 5 to lower to the certain temperature (the temperature at which there is no hindrance even if the preheating is resumed) is. Here, numerical values in the drawing are examples.

Figure 6:
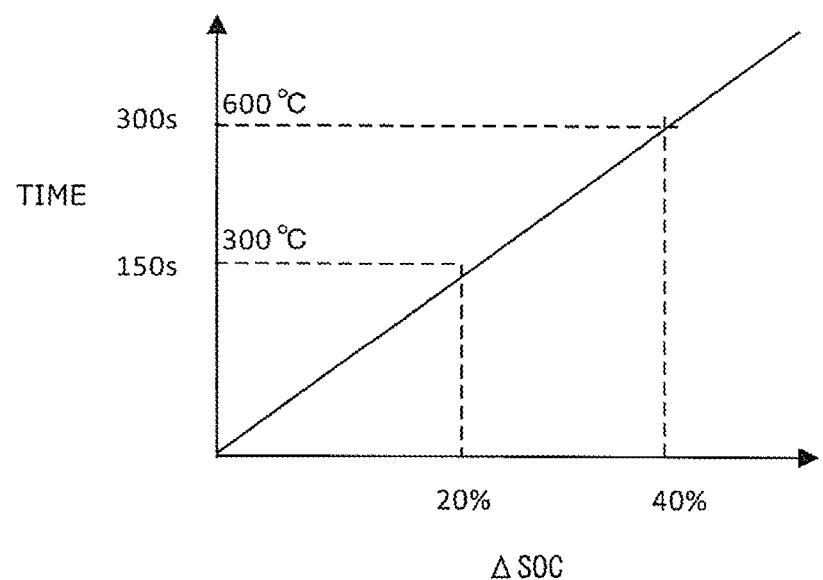
FIG. 6 is a characteristic diagram showing a relationship between a change amount (a variation) ΔSOC of the SOC and a time tc2 that becomes a cooling period.

Therefore, from such a relationship, as shown in FIG. 6, a time of the threshold value tc2 can be set according to the change amount (the variation) ΔSOC of the SOC, and as the change amount ΔSOC becomes larger, the threshold value tc2 is set to be larger.

As described above, in the second embodiment, the temperature of the electric heating catalyst 5 at the time of the loss of the power is estimated, and the threshold value tc2 as the cooling period is set. Therefore, the cooling period, which is the waiting time until the preheating is resumed, becomes shorter than that in the first embodiment which is based on the preheating completion temperature, thereby resuming the preheating earlier.

Figure 7:
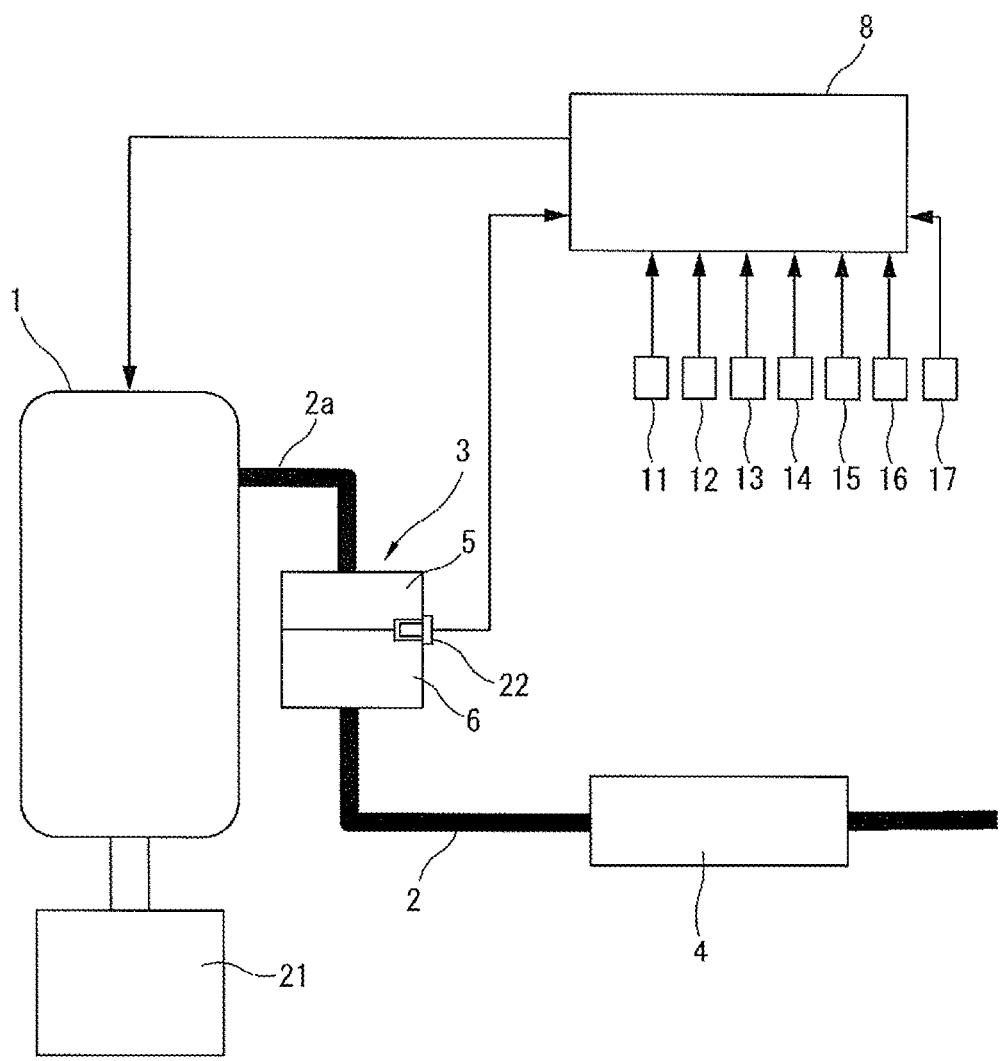
FIG. 7 is an explanatory drawing showing a system configuration of an internal combustion engine according to a third embodiment.
Figure 8:
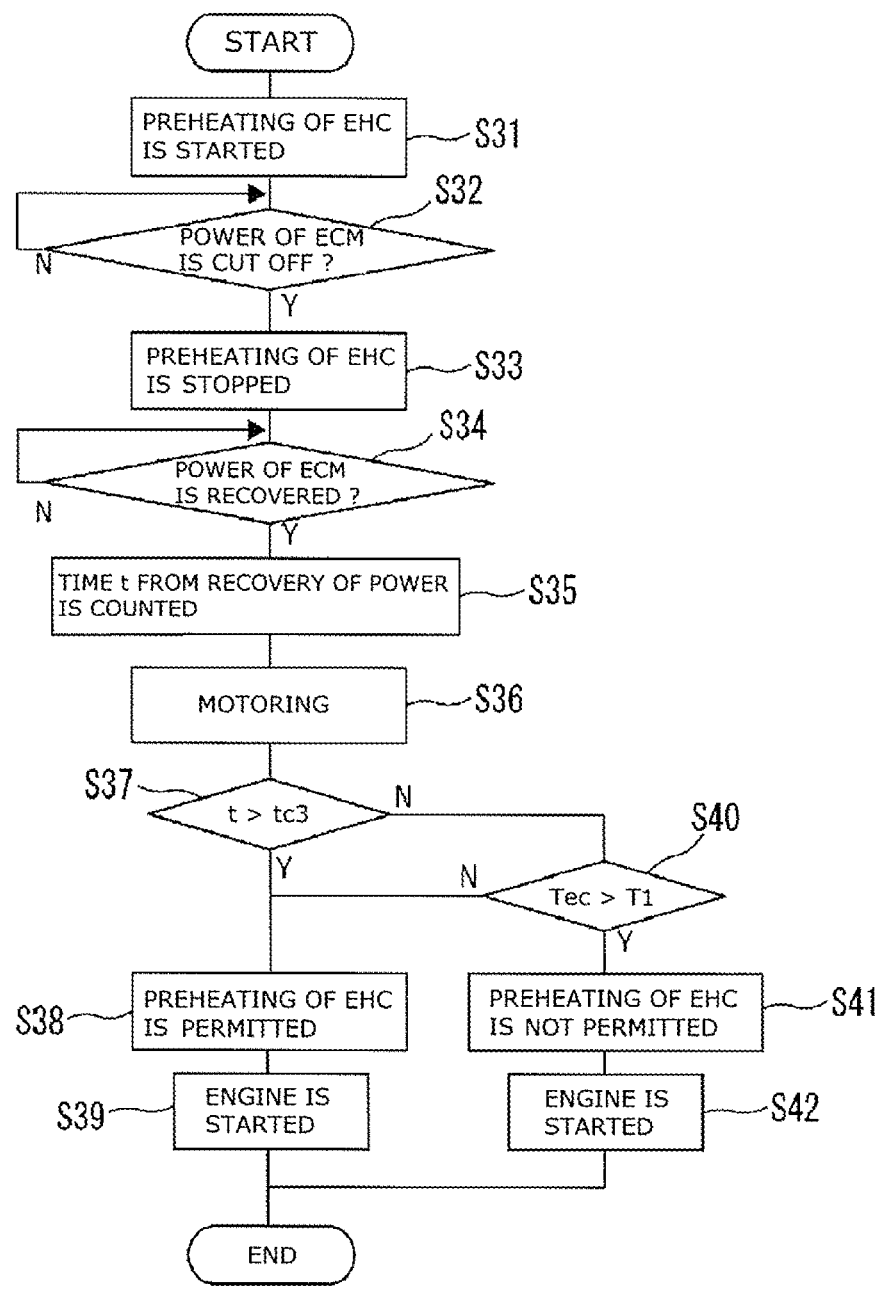
FIG. 8 is a flow chart showing a flow of a process of the third embodiment.

Next, FIG. 8 shows a flow chart of a third embodiment, and FIG. 7 shows a system configuration of the internal combustion engine 1 according to the third embodiment.

As shown in FIG. 7, the third embodiment is applied to the internal combustion engine 1 that drives a generator 21 as a so-called series hybrid vehicle. In the series hybrid vehicle, driving wheels are driven by a travelling motor (not shown), and the internal combustion engine 1 is used for power generation.

In the third embodiment, as described later, during the cooling period of the electric heating catalyst 5, motoring (rotating) of the internal combustion engine 1 is performed with the generator 21 as a motor/generator being a drive source. Since gas flows from the intake system to the exhaust system of the internal combustion engine 1 by this motoring, the electric heating catalyst 5 is forcibly cooled.

Further, in the present embodiment, a temperature sensor 22 for detecting temperature of the gas that passes through the electric heating catalyst 5 is set at a downstream side (an outlet side) of the electric heating catalyst 5. As a preferable example, the temperature sensor 22 is set in the vicinity of a boundary between the upstream-side electric heating catalyst 5 and the downstream-side catalyst 6 in the casing of the pre-catalyst 3. When the gas flows through the pre-catalyst 3 by the motoring, a detection value according to the temperature of the electric heating catalyst 5 is measured by the temperature sensor 22. Therefore, while the gas is flowing, the temperature of the electric heating catalyst 5 can be substantially detected by the temperature sensor 22.

In the flow chart in FIG. 8, steps S31 to S35 are the same as steps S1 to S5 of the first embodiment. When it is detected that the driver's seat door has been opened, the energization of the electric heating catalyst 5 is started, that is, the preheating of the electric heating catalyst 5 is started (step S31). Subsequently, a judgment is made as to whether or not an event in which the power of the engine controller 8 is lost (cut off) has occurred (step S32).

When the power of the engine controller 8 is cut off, the energization of the electric heating catalyst 5 is stopped by and according to this cut-off (step S33). Afterwards, when the power of the engine controller 8 is recovered (step S34), the engine controller 8 starts to measure a timer t that measures an elapsed time from a time of this recovery of the power (step S35).

Here, in the third embodiment, motoring (rotating) of the internal combustion engine 1 is performed using the generator 21 (step S36). By this motoring, as described above, the gas flows through the electric heating catalyst 5, and the forcible cooling of the electric heating catalyst 5 is carried out.

At next step S37, the engine controller 8 compares a value of the timer t with a threshold value tc3. The threshold value tc3 is appropriately set on the basis of the forcible cooling by the motoring. When the value of the timer t, i.e. the elapsed time from the recovery of the power, is the threshold value tc3 or less, as shown as step S41, the energization (the preheating) of the electric heating catalyst 5 is forbidden or stopped. If there is a start request of the internal combustion engine 1 during this period, as shown as step S42, the internal combustion engine 1 is started without preheating the electric heating catalyst 5.

When the elapsed time t from the recovery of the power exceeds the threshold value tc3, as shown as step S38, the energization of the electric heating catalyst 5, i.e. the preheating of the electric heating catalyst 5, is performed as usual. That is, the preheating from an initial state in which the electric heating catalyst 5 is regarded as being in a cold state is performed again. Then, the internal combustion engine 1 is started by and according to the start request of the internal combustion engine 1 (step S39).

Here, in the third embodiment, at step S40, the engine controller 8 further compares a temperature Tec of the electric heating catalyst 5 detected by the temperature sensor 22 with a threshold temperature T1. Then, when the temperature Tec of the electric heating catalyst 5 is equal to or less than the threshold temperature T1 while the elapsed time t is the threshold value tc3 or less, resumption of the preheating is permitted.

As described above, in the third embodiment, by performing the motoring of the internal combustion engine 1, the forcible cooling of the electric heating catalyst 5 can be carried out. Therefore, the coolingperiod, which is the waiting time until the preheating is resumed, can be shorter than the case of the natural cooling (the self-cooling).

Further, by generating the gas flow in the exhaust passage 2 by the motoring, detection of the temperature of the electric heating catalyst 5 by the temperature sensor 22 located at the downstream side of the electric heating catalyst 5 becomes possible. It is therefore possible to resume the preheating by detecting that the temperature of the electric heating catalyst 5 actually decreases to the threshold temperature T1.

Here, in the third embodiment, the threshold value tc3 of the elapsed time t is fixedly set, which is similar to the first embodiment. However, similar to the second embodiment, the threshold value tc3 could be variably set according to the change amount ΔSOC of the SOC.

Further, this third embodiment can be applied to not only the series hybrid vehicle, but also a vehicle as long as this vehicle has a configuration in which the internal combustion engine 1 can be driven by any external drive source.

Figure 9:
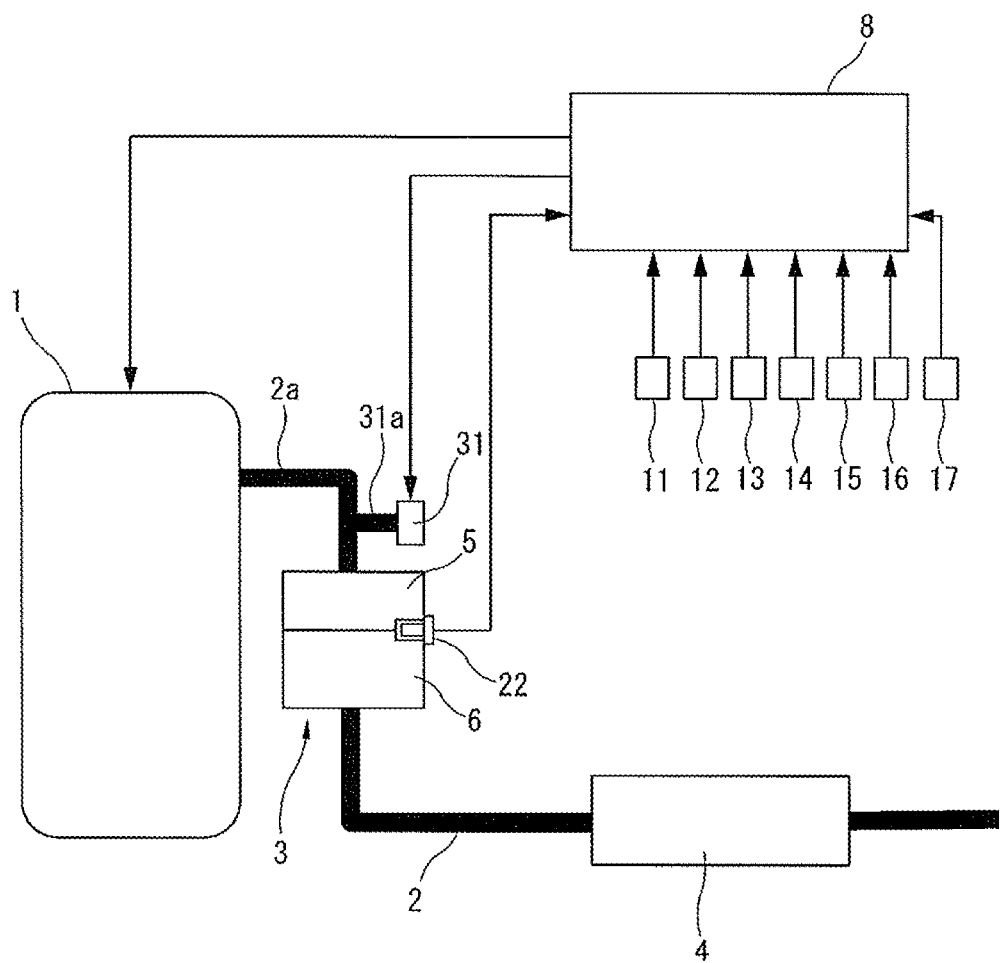
FIG. 9 is an explanatory drawing showing a system configuration of an internal combustion engine according to a fourth embodiment.
Figure 10:
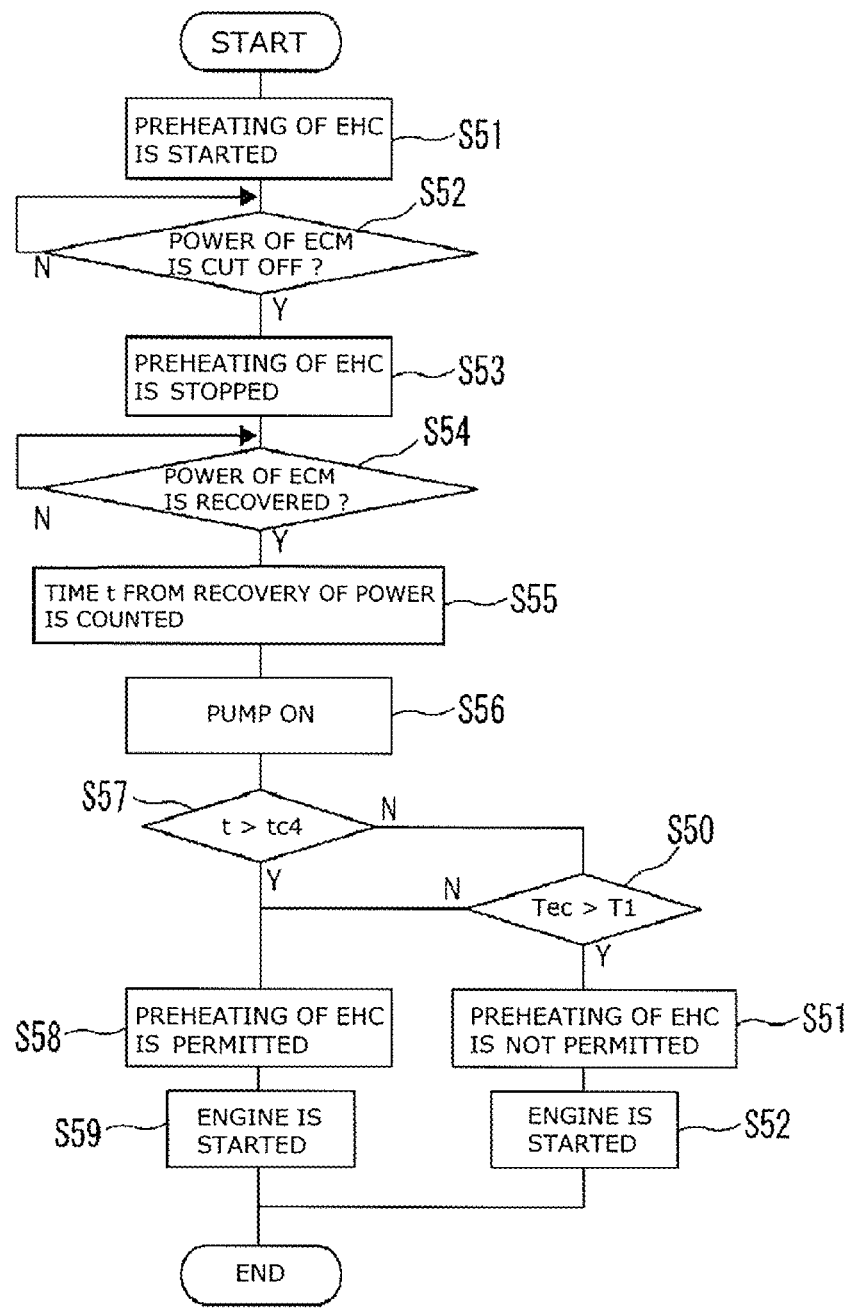
FIG. 10 is a flow chart showing a flow of a process of the fourth embodiment.

Next, FIG. 10 shows a flow chart of a fourth embodiment, and FIG. 9 shows a system configuration of the internal combustion engine 1 according to the fourth embodiment.

In the fourth embodiment, as shown in FIG. 9, as a configuration, a secondary air pump 31 that can supply secondary air to the electric heating catalyst 5 in the exhaust passage 2 is provided. The secondary air pump 31 is connected to the exhaust passage 2 at an upstream side of the electric heating catalyst 5 through a secondary air passage 31a.

In the fourth embodiment, as described later, during the cooling period of the electric heating catalyst 5, by driving the secondary air pump 31, forcible cooling of the electric heating catalyst 5 by flow of the secondary air is carried out.

Further, in the present embodiment, similar to the third embodiment, a temperature sensor 22 for detecting temperature of the gas that passes through the electric heating catalyst 5 is set at a downstream side (an outlet side) of the electric heating catalyst 5. As a preferable example, the temperature sensor 22 is set in the vicinity of a boundary between the upstream-side electric heating catalyst 5 and the downstream-side catalyst 6 in the casing of the pre-catalyst 3. The secondary air flows through the pre-catalyst 3, then, similar to the third embodiment, the temperature of the electric heating catalyst 5 can be substantially detected by the temperature sensor 22.

The flow chart in FIG. 10 is the same as the flow chart in FIG. 8 of the third embodiment except for step S56. That is, when it is detected that the driver's seat door has been opened, the energization of the electric heating catalyst 5 is started, that is, the preheating of the electric heating catalyst 5 is started (step S51). Subsequently, a judgment is made as to whether or not an event in which the power of the engine controller 8 is lost (cut off) has occurred (step S52).

When the power of the engine controller 8 is cut off, the energization of the electric heating catalyst 5 is stopped by and according to this cut-off (step S53). Afterwards, when the power of the engine controller 8 is recovered (step S54), the engine controller 8 starts to measure a timer t that measures an elapsed time from a time of this recovery of the power (step S55).

Here, in the fourth embodiment, instead of the motoring of the third embodiment, the secondary air pump 31 is operated (step S56). By this supply of the secondary air, the gas flows through the electric heating catalyst 5, then the forcible cooling is carried out.

At next step S57, the engine controller 8 compares a value of the timer t with a threshold value tc4. The threshold value tc4 is appropriately set on the basis of the forcible cooling by the supply of the secondary air. When the value of the timer t, i.e. the elapsed time from the recovery of the power, is the threshold value tc4 or less, as shown as step S51, the energization (the preheating) of the electric heating catalyst 5 is forbidden or stopped. If there is a start request of the internal combustion engine 1 during this period, as shown as step S52, the internal combustion engine 1 is started without preheating the electric heating catalyst 5.

When the elapsed time t from the recovery of the power exceeds the threshold value tc4, as shown as step S58, the energization of the electric heating catalyst 5, i.e. the preheating of the electric heating catalyst 5, is performed as usual. That is, the preheating from an initial state in which the electric heating catalyst 5 is regarded as being in a cold state is performed again. Then, the internal combustion engine 1 is started by and according to the start request of the internal combustion engine 1 (step S59).

In addition, at step S50, the engine controller 8 further compares a temperature Tec of the electric heating catalyst 5 detected by the temperature sensor 22 with a threshold temperature T1. Then, when the temperature Tec of the electric heating catalyst 5 is equal to or less than the threshold temperature T1 while the elapsed time t is the threshold value tc4 or less, resumption of the preheating is permitted.

As described above, in the fourth embodiment, by the supply of the secondary air, the forcible cooling of the electric heating catalyst 5 can be carried out. Therefore, the cooling period, which is the waiting time until the preheating is resumed, can be shorter than the case of the natural cooling (the self-cooling).

Further, similar to the third embodiment, by generating the gas flow in the exhaust passage 2, detection of the temperature of the electric heating catalyst 5 by the temperature sensor 22 located at the downstream side of the electric heating catalyst 5 becomes possible. It is therefore possible to resume the preheating by detecting that the temperature of the electric heating catalyst 5 actually decreases to the threshold temperature T1.

Here, in the fourth embodiment, the threshold value tc4 of the elapsed time t is fixedly set, which is similar to the first embodiment. However, similar to the second embodiment, the threshold value tc4 could be variably set according to the change amount ΔSOC of the SOC.

The invention claimed is:

1. A method for controlling an internal combustion engine having an electric heating catalyst in an exhaust system, the method including starting preheating of the electric heating catalyst by energizing the electric heating catalyst before starting the internal combustion engine, and performing the preheating until an estimated temperature of the electric heating catalyst, which is sequentially estimated, reaches a predetermined temperature, the method comprising:
   when information on the estimated temperature is lost during the preheating due to loss of power of an engine controller,
   forbidding energization of the electric heating catalyst until a cooling period necessary for temperature of the electric heating catalyst to fall elapses after recovery of the power of the engine controller.

2. The method for controlling the internal combustion engine as claimed in claim 1, further comprising:
   fixedly setting the cooling period to a predetermined necessary time with the electric heating catalyst regarded as being at the predetermined temperature at a time of the recovery of the power.

3. The method for controlling the internal combustion engine as claimed in claim 1, further comprising:
   determining, from a charge amount of a battery at a time of the start of the preheating and a charge amount of the battery at a time of the recovery of the power, an energization amount of the electric heating catalyst until the power is lost; and
   variably setting the cooling period so that the larger the energization amount is, the longer the cooling period is.

4. The method for controlling the internal combustion engine as claimed claim 1, further comprising:
   during the cooling period, making air flow through the electric heating catalyst by motoring the internal combustion engine by an external drive source.

5. The method for controlling the internal combustion engine as claimed in claim 1, further comprising:
   during the cooling period, supplying secondary air to the electric heating catalyst from an upstream side of the electric heating catalyst in the exhaust system by a secondary air pump.

6. The method for controlling the internal combustion engine as claimed in claim 4, wherein
   a temperature sensor is provided at a downstream side of the electric heating catalyst, and the method further comprising:
   when it is judged, from a detection temperature of the temperature sensor, that the temperature of the electric heating catalyst decreases, ending the cooling period.

7. The method for controlling the internal combustion engine as claimed in claim 5, wherein
   a temperature sensor is provided at a downstream side of the electric heating catalyst, and the method further comprising:
   when it is judged, from a detection temperature of the temperature sensor, that the temperature of the electric heating catalyst decreases, ending the cooling period.

8. A control device for an internal combustion engine comprising:
   the internal combustion engine having an electric heating catalyst in an exhaust system; and
   an engine controller configured to start preheating of the electric heating catalyst by energizing the electric heating catalyst before starting the internal combustion engine, and perform the preheating until an estimated temperature of the electric heating catalyst, which is sequentially estimated, reaches a predetermined temperature,
   wherein the engine controller is further configured to, when information on the estimated temperature is lost during the preheating due to loss of power of the engine controller, forbid energization of the electric heating catalyst until a cooling period necessary for temperature of the electric heating catalyst to fall elapses after recovery of the power of the engine controller.

* * * * *